(12) United States Patent
Nakamura

(10) Patent No.: US 9,942,065 B2
(45) Date of Patent: Apr. 10, 2018

(54) WIRELESS COMMUNICATION DEVICE, WIRELESS COMMUNICATION SYSTEM, AND RECORDING MEDIUM

(71) Applicant: CASIO COMPUTER CO., LTD., Tokyo (JP)

(72) Inventor: Yoshiaki Nakamura, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 111 days.

(21) Appl. No.: 14/971,371

(22) Filed: Dec. 16, 2015

(65) Prior Publication Data

US 2016/0234047 A1 Aug. 11, 2016

(30) Foreign Application Priority Data

Feb. 6, 2015 (JP) .................. 2015-022192

(51) Int. Cl.
| | | |
|---|---|---|
| *H04L 25/20* | (2006.01) | |
| *H04W 76/02* | (2009.01) | |
| *H04W 84/18* | (2009.01) | |
| *H04W 4/00* | (2018.01) | |
| *H04W 4/04* | (2009.01) | |
| *H04W 84/12* | (2009.01) | |
| *H04W 88/04* | (2009.01) | |

(52) U.S. Cl.
CPC .......... *H04L 25/20* (2013.01); *H04W 76/023* (2013.01); *H04W 4/008* (2013.01); *H04W 4/04* (2013.01); *H04W 84/12* (2013.01); *H04W 84/18* (2013.01); *H04W 88/04* (2013.01)

(58) Field of Classification Search
CPC .... H04L 25/20; H04W 76/023; H04W 4/008; H04W 4/04; H04W 84/18; H04W 84/12; H04W 88/04
See application file for complete search history.

(56) References Cited

U.S. PATENT DOCUMENTS 8,744,419 B2 * 6/2014 Hall .................... H04L 12/1845
370/328
8,805,382 B2 * 8/2014 Rahman ............ H04W 28/0268
455/414.1

(Continued)

FOREIGN PATENT DOCUMENTS

WO WO 2010/110426 A1 9/2010

*Primary Examiner* — Brian O'Connor
(74) *Attorney, Agent, or Firm* — Scully, Scott, Murphy & Presser, P.C.

(57) ABSTRACT

A wireless communication device includes a wireless communication unit and a processor. The wireless communication unit connects to relays for wireless communication and transmits and receives communication data via the relays by wireless communication. The processor determines a second relay different from a first relay currently connected to the wireless communication unit and a timing of connection to the second relay based on a predetermined connection standard. When setting are provided for switching destination to the second relay at the timing of connection, the processor instructs the wireless communication unit to send information on the second relay and information at the timing of connection to other predetermined wireless communication device. The processor instructs the wireless communication unit to switch the destination to the second relay at the timing of connection.

20 Claims, 10 Drawing Sheets

(56) References Cited

U.S. PATENT DOCUMENTS

| | | | |
|---|---|---|---|
| 9,264,863 B2* | 2/2016 | Hall | H04L 12/1845 |
| 9,295,022 B2* | 3/2016 | Bevan | H04W 64/00 |
| 9,674,747 B2* | 6/2017 | Zalzalah | H04W 28/16 |
| 9,716,763 B2* | 7/2017 | Barablin | H04L 67/148 |
| 2010/0137021 A1* | 6/2010 | Sharret | H04W 88/04 |
| | | | 455/550.1 |
| 2014/0024383 A1* | 1/2014 | Rahman | H04W 28/0268 |
| | | | 455/445 |
| 2016/0029190 A1* | 1/2016 | Rattner | G06F 17/28 |
| | | | 455/414.4 |
| 2016/0212666 A1* | 7/2016 | Zalzalah | H04W 28/16 |

* cited by examiner

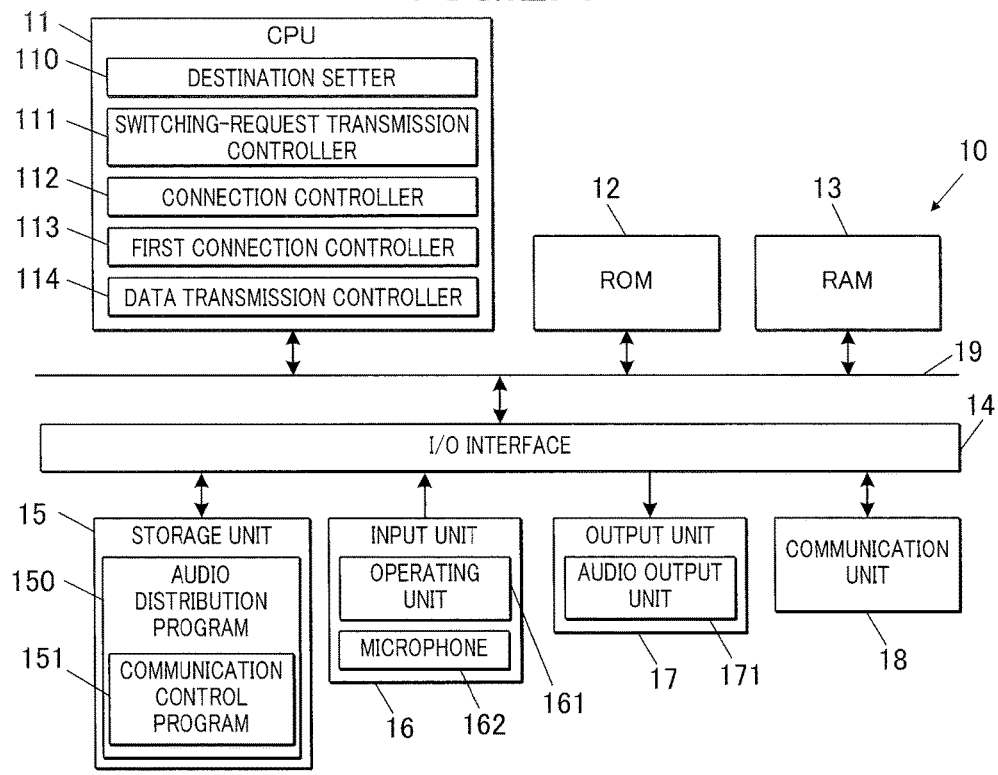
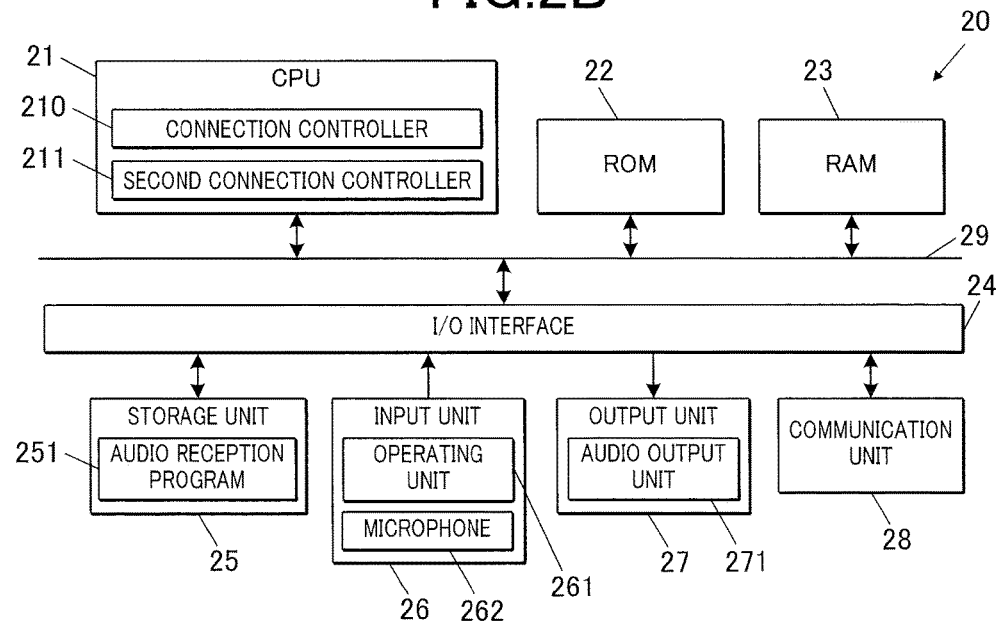

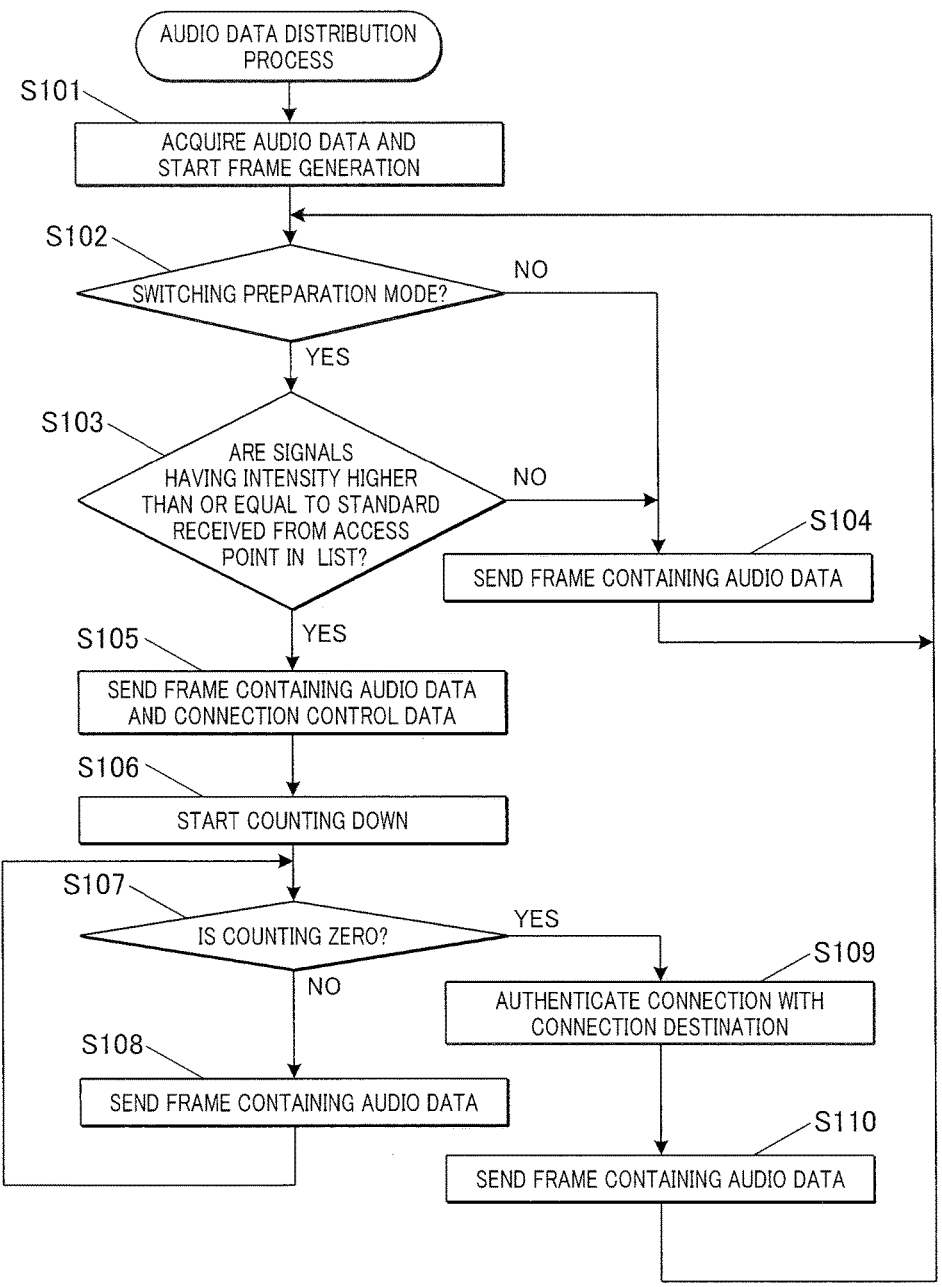

WIRELESS COMMUNICATION DEVICE, WIRELESS COMMUNICATION SYSTEM, AND RECORDING MEDIUM

CROSS REFERENCE TO RELATED APPLICATION

This application is based upon and claims the benefit of priority under 35 USC 119 of Japanese Patent Application No. 2015-022192 filed on Feb. 6, 2015, the entire disclosure of which, including the description, claims, drawings and abstract, is incorporated herein by reference in its entirety.

BACKGROUND OF THE INVENTION

1. Field of the Invention

The present invention relates to a wireless communication device, a wireless communication system, and a recording medium.

2. Description of Related Art

A technique is known for connecting multiple electronic devices (wireless communication devices) that can establish wireless communication involving wireless local area networks (LANs) (IEEE 802.11) to access points and thereby accessing networks, such as the Internet. The access points are usually fixed. Another technology is known for constantly switching to an appropriate access point while a portable wireless communication device carried by a moving user establishes continuous connection with a network.

Constant switching to an access point as described above while multiple wireless communication devices are to be connected to a single limited local area network (LAN) precludes the establishment of the LAN across different access points. Thus, the multiple wireless communication devices are connected to a single access point so as to establish a local network (subnetwork).

If each of the multiple wireless communication devices individually switch to a different access point, each wireless communication device will be switching to an access point at a different timing. This causes temporary disconnection of a wireless communication device from the other wireless communication devices within the LAN. Such disconnection precludes fast and limited transmission and reception of data within the LAN. As a solution to such a problem, for example, according to WO2010/110426, an access point connected to a wireless communication device (client) can detect other access points and determines whether to switch to one of the other access points. In this technique, before the destination access point is to be switched, the access point sends a request for the switching of access point to the wireless communication device connected to itself and disconnects from the wireless communication device.

The control of the timing of switching by the access points requires similar configurations and functions for all the access points to be connected to wireless communication devices. Thus, ready communication among multiple specific wireless communication devices can only be maintained through high costs and troublesome operations.

SUMMARY OF THE INVENTION

The present invention provides a wireless communication device, a wireless communication system, and a recording medium that can readily maintain communication among multiple specific wireless communication devices without high costs and troublesome operations.

In order to realize the above object, according to a first aspect of the present invention, there is provided a wireless communication device, including:

a wireless communication unit that connects to relays for wireless communication and transmits and receives communication data via the relays by wireless communication; and a processor that determines a second relay different from a first relay currently connected to the wireless communication unit and a timing of connection to the second relay based on a predetermined connection standard, instructs the wireless communication unit to send information on the second relay and information at the timing of connection to other predetermined wireless communication device when setting are provided for switching destination to the second relay at the timing of connection, and instructs the wireless communication unit to switch the destination to the second relay at the timing of connection.

According to a second aspect of the present invention, there is provided a wireless communication device including:

a wireless communication unit that connects to relays for wireless communication and transmits and receives communication data via the relays by wireless communication; and a processor that instructs the wireless communication unit to switch destination to a second relay at a timing of connection to the second relay when the wireless communication unit connected to the first relay receives information on the second relay and information at the timing of connection.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 2A is a block diagram illustrating the functional configuration of a communication device (master);

FIG. 2B is a block diagram illustrating the functional configuration of another communication device (slave);

FIG. 5 is a flow chart illustrating a control process of audio data distribution;

DETAILED DESCRIPTION OF THE PREFERRED EMBODIMENT

Hereinafter, an embodiment of the present invention will be described with reference to the drawings. Though various technical limitations which are preferable to perform the present invention are included in the after-mentioned embodiment, the scope of the invention is not limited to the following embodiment and the illustrated examples.

First Embodiment

Figure 1:
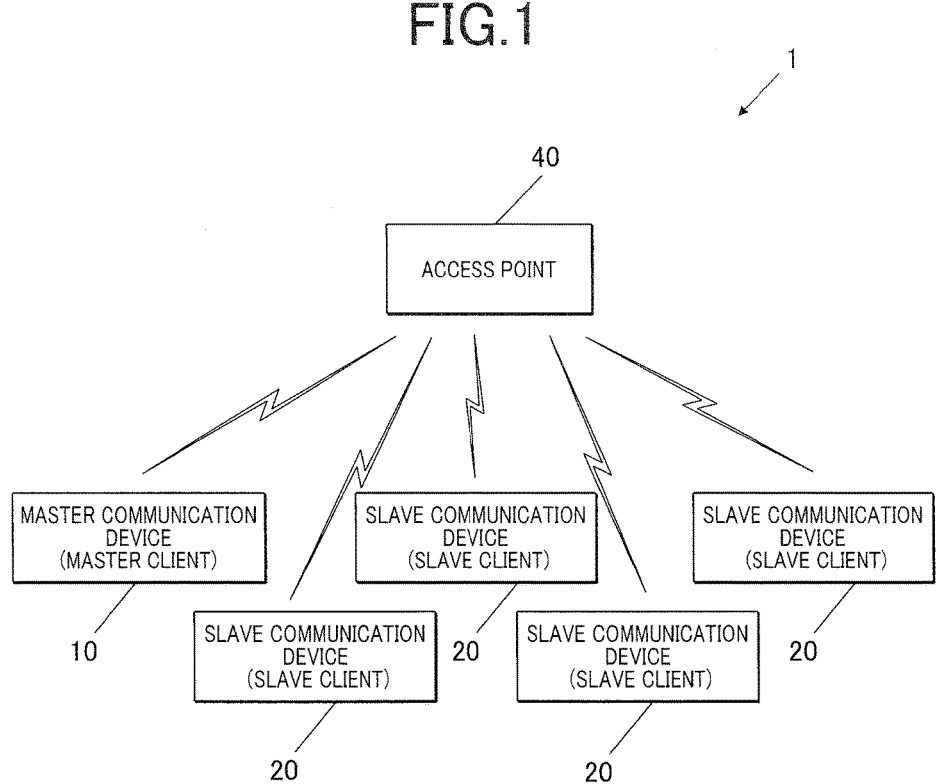
FIG. 1 illustrates the overall configuration of a wireless communication system according to an embodiment of the present invention.

FIG. 1 illustrates the overall configuration of a wireless communication system according to the first embodiment of the present invention.

A wireless communication system 1 according to the first embodiment includes a single master communication device 10 (master client, master wireless communication device, wireless communication device, computer), multiple slave communication devices 20 (slave clients, other wireless communication devices, slave wireless communication devices), and an access point 40 (relays) that connects to one device at one time. The master communication device 10 and the slave communication devices 20 are connected via an access point 40 within a wireless LAN and establish wireless communication between each other.

The master communication device 10 multicasts audio data to the slave communication devices 20 through the execution of an audio transmission application program. The master communication device 10 outputs a control signal for simultaneous switching of the access point 40 connected to the master communication device 10 and the slave communication devices 20. An example of the master communication device 10 is a smart phone. Other examples of the master communication device 10 include a dedicated communication device for a specific purpose, such as an audio guiding device, and a notebook computer.

The slave communication devices 20 decrypts the audio data sent from the master communication device 10 and output sound. Each of the slave communication devices 20 switches access points within the wireless LAN at a predetermined timing depending on connection control data sent from the master communication device 10. Similar to the master communication device 10, an example of the slave communication devices 20 is a smart phone.

An access point 40 functions at least as a switching hub that controls the transmission and reception of wireless communication data among several communication devices (including the master communication device 10). Examples of the access point 40 include a router and a layer 3 (L3) switch connectable to an external network, such as the Internet. All or some of the clients connected to an access point 40 are established within a single LAN (subnetwork). For example, fixed IP addresses are preliminarily assigned to the master communication device 10 and the slave communication devices 20, and an access point 40 (router) establishes a single LAN (subnetwork) containing all of the assigned IP addresses.

FIGS. 2A and 2B are block diagrams illustrating the functional configurations of the master communication device 10 and the slave communication devices 20 according to this embodiment, respectively.

With reference to FIG. 2A, the master communication device 10 includes a central processing unit (CPU) 11 (including a processor, a destination setter 110, a switching-request transmission controller 111, a connection controller 112, a first connection controller 113, a data transmission controller 114), a read only memory (ROM) 12, a random access memory (RAM) 13, an input-output (I/O) interface 14, a storage unit 15 (storage medium), an input unit 16, an output unit 17, a communication unit 18 (including a wireless communication unit, a first wireless communication unit), and a bus 19.

The CPU 11 carries out various calculation processes and comprehensively controls the operation of the master communication device 10. The CPU 11 executes an audio distribution program 150, which is described below, and distributes the audio data input from the input unit 16 to the slave communication devices 20. The CPU 11 includes a destination setter 110, a switching-request transmission controller 111, a connection controller 112, a first connection controller 113, and a data transmission controller 114. The destination setter 110, the switching-request transmission controller 111, the connection controller 112, the first connection controller 113, and the data transmission controller 114 may be composed of a single CPU or dedicated single-purpose CPUs.

The ROM 12 stores basic control programs involving the operation of the master communication device 10 and initial setting data. The ROM 12 includes a mask ROM and may further include an updatable EEPROM or a flash memory as built-in storage.

The RAM 13 provides a work space to the CPU 11 and temporarily stores data. Examples of the RAM 13 include volatile memories such as DRAM and SRAM.

The I/O interface 14 is connected to the bus 19 together with the CPU 11, the ROM 12, and the RAM 13 (which are collectively referred to as controller) and controls data transmission between external devices and the controller according to the standards of the connecting devices.

The storage unit 15 is a portable external storage medium that is detachable and computer-readable, such as a MiniSD card. The MiniSD card stores various application programs and data. One of the programs stored in the storage unit 15 is the audio distribution program 150. The audio distribution program 150 contains a communication control sub-program 151 for controlling the settings of access points of the master communication device 10 and the slave communication devices 20.

The input unit 16 includes an operating unit 161 that is operated by the user. The operating unit 161, for example, includes a touch panel overlaid on the display screen of the output unit 17 and a push-button switch and/or a sliding switch disposed on the side of the smart phone. The input unit 16 converts the operation carried out on the operating unit 161 into electrical signals and sends these signals to the I/O interface 14. The input unit 16 includes a microphone 162 that collects sound.

The output unit 17 outputs signals that can be visibly, auditorily, or tactually perceived by the user. The output unit 17 includes a display having a display screen, an audio output unit 171 that announces incoming calls, for example, and a vibration generator. The display screen may be, for example, a liquid crystal display (LCD) or any other suitable device. The display may include a light emitting diode (LED) lamp. The audio output unit 171 includes a speaker that outputs sound, an earphone connection terminal (earphone jack), and a circuit containing a piezoelectric device that generates a beep. An example of the vibration generator is a vibratory motor unit including a weighted rotary motor.

The communication unit 18 establishes wireless communication with an external device of the master communication device 10 according to a predetermined standard. The communication unit 18 includes a transceiver circuit and a built-in antenna for transmission and reception of communication signals to/from a base station for telephone communication, for example, and a network card and a built-in antenna for connection to the Internet or a wireless LAN (IEEE802.11) for data communication. The communication unit 18 may further include an RFIC tag for near-field wireless communication and a communication module for near-field wireless communication, such as Bluetooth™ communication.

The bus 19 is a communication path for data transmission among the components of the controller and the I/O interface 14.

Individual I/O interfaces 14 may be provided for the storage unit 15, the input unit 16, the output unit 17, and the communication unit 18, and connected to the bus 19.

With reference to FIG. 2B, the slave communication devices 20 each includes a CPU 21 (including a connection controller 210 and a second connection controller 211), a ROM 22, a RAM 23, an I/O interface 24, a storage unit 25, an input unit 26, an output unit 27, a communication unit 28, and a bus 29. The input unit 26 includes an operating unit 261 and a microphone 262. The output unit 27 includes an audio output unit 271. The CPU 21 includes a connection controller 210 and a second connection controller 211. The connection controller 210 and the second connection controller 211 may be composed of a single CPU or dedicated single-purpose CPUs.

The CPU 21, the ROM 22, the RAM 23, the I/O interface 24, the input unit 26, the output unit 27, the communication unit 28, and the bus 29 respectively have the same configurations as the CPU 11, the ROM 12, the RAM 13, the I/O interface 14, the input unit 16, the output unit 17, the communication unit 18, and the bus 19 of the master communication device 10; thus, redundant descriptions are omitted.

Similar to the storage unit 15 of the master communication device 10, the storage unit 25 is a computer-readable, portable external storage medium, such as a MiniSD card. The storage unit 25 stores an audio reception program 251 for receiving audio signals from the master communication device 10 and playing these audio signals.

Audio distribution from the master communication device 10 to the slave communication devices 20 will now be described.

Figure 3:
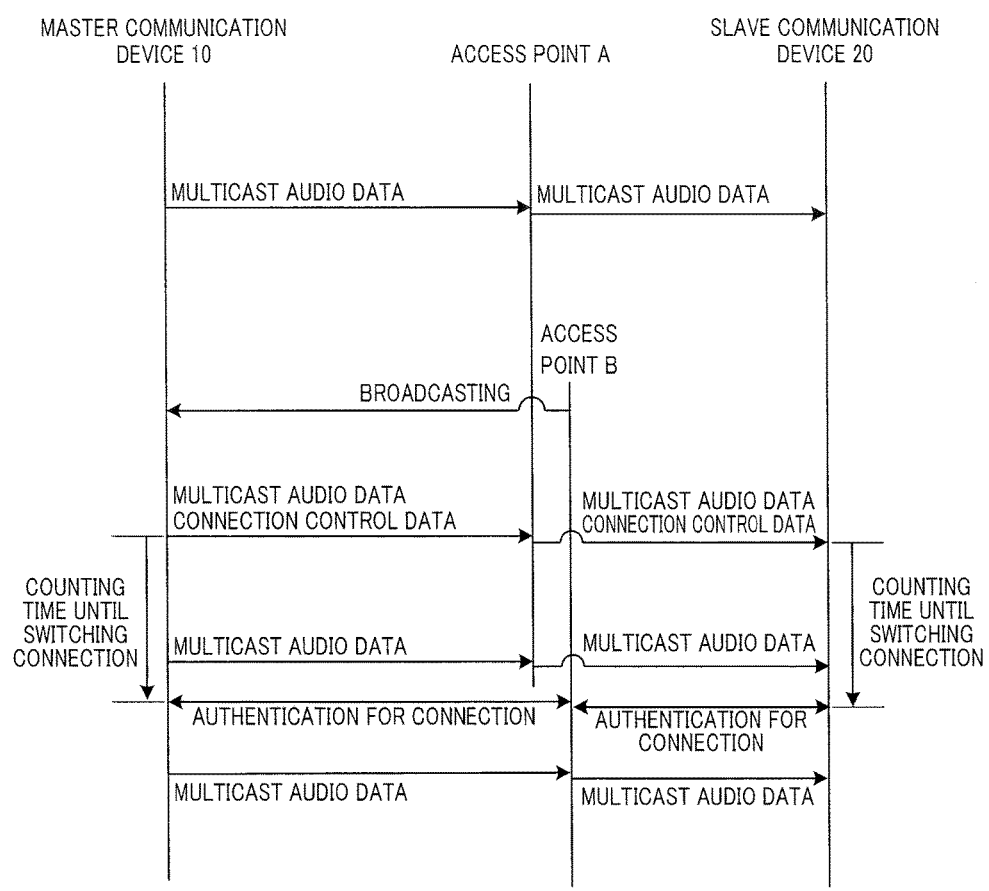
FIG. 3 illustrates a communication sequence involving audio distribution among a master communication device, an access point, and a slave communication device.

FIG. 3 illustrates a sequence of data transmission and reception involving audio distribution.

Audio signals are distributed from the master communication device 10 to multiple slave communication devices 20 via an access point 40 connected to both the master communication device 10 and the slave communication devices 20 within a wireless LAN. The audio distribution program 150 is executed to distribute audio data corresponding to sounds input to the microphone 162 of the master communication device 10, e.g., announcements made by a tour guide, to the slave communication devices 20 in substantially real time.

The audio data to be distributed is divided into data segments having a predetermined data length and send to an access point A connected to the master communication device 10 for multicasting to a predetermined slave communication devices 20 assigned as the destination at a predetermined cycle. Alternatively, the audio data may be broadcasted if only the master communication device 10 and the slave communication devices 20 are within a single LAN. The router of the access point A transfers the audio data to the slave communication devices 20 assigned as multicast destinations. The multicast destinations are assigned by fixed IP addresses of the slave communication devices 20 preliminarily stored in the storage unit 15. The fixed IP addresses are addresses within a single subnetwork (LAN) that can be assigned as multicast destinations.

The master communication device 10 constantly receives broadcasting of beacons, such as service set identifiers (SSIDs) from the access points 40 under settings that allow switching of the access points and identifies the access points 40 and the reception intensity. In an SSID stealth mode in which the access points are not sending SSIDs, a probing request is sent to an SSID selected from a list of destination access points preliminarily stored in the storage unit 15 by the master communication device 10, and the response is received by the master communication device 10 to identify the reception intensity.

If the master communication device 10 determines the reception of signals satisfying a predetermined connection standard, or, in this case, a reception intensity (the intensity of signals represented by a power value or amplitude) higher than or equal to a reference value from an access point B (second relay), which is different from the access point A (first relay) currently connected to the master communication device 10, the master communication device 10 determines the switching of the destination to the access point B and multicasts audio data and control data associated with the updated access point and the timing of switching (timing of connection) (which is, in this case, the counted time (waiting time)), to the access point A. The router of the access point A multicasts this data to the assigned slave communication devices 20.

The master communication device 10 continues to send the data containing audio data to the slave communication devices 20 and counts the time until the switching of the destination. Similarly, each of the slave communication devices 20 continues to receive the audio data from the master communication device 10 via the access point A, processes the received audio data, and counts the time received from the master communication device 10 (a predetermined wireless communication device) in the form of control data.

After counting the time, the master communication device 10 and the slave communication devices 20 disconnect from the access point A, authenticate the connection to the access point B, and switch the destination to the access point B. After authentication of the connection, the master communication device 10 sends the audio data to be multicast to the slave communication devices 20 to the access point B. The router of the access point B sends the audio data to the slave communication devices 20 assigned as multicast destinations. Each of the slave communication devices 20 appropriately processes the received audio data for playing.

FIGS. 4A to 4D illustrate the format of the data sent from the master communication device 10 according to this embodiment.

Figure 4A:
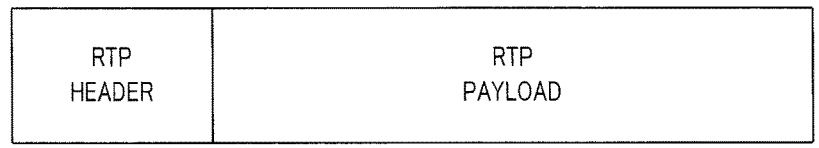
FIG. 4A illustrates a format of data for audio distribution.

The master communication device 10 according to this embodiment digitizes the audio signals acquired by the microphone 162 and multicasts the digitized data in real time according to the Real-time Transport Protocol (RTP) (predetermined format) and the User Datagram Protocol/Internet Protocol (UDP/IP). With reference to FIG. 4A, RTP data contains an RTP header in front of the RTP payload consisting of audio data and the control data described above. A media access control (MAC) frame body is generated by adding a UDP header (transport layer) and an IP header (network layer) to the RTP data. The communication unit 18 appropriately encrypts the MAC frame body (through schemes such as WEP, WPA-TKIP, and WPA2-AES encryption), generates a MAC frame by adding an IEEE 802.11 header to the MAC frame body, adds a physical header to and MAC frame data (frame data), and sends this MAC frame data to an access point 40. Each slave communication device 20 confirms that the MAC address of the frame data sent from the access point 40 corresponds to itself (a MAC address corresponding to a multicast address including the slave communication device 20), receives the frame data, decrypts the MAC frame body, formats the data with UDP/IP and RTP, and processes the data.

Figure 4B:
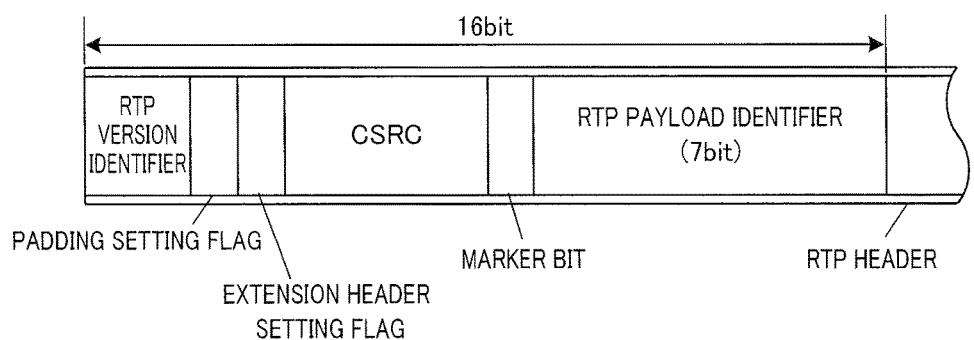
FIG. 4B illustrates the format of data for audio distribution.
Figure 4C:
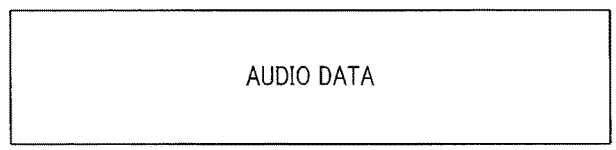
FIG. 4C illustrates the format of data for audio distribution.
Figure 4D:
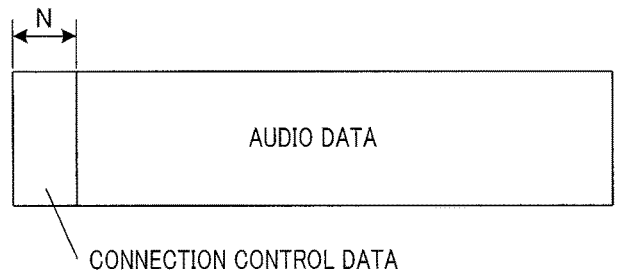
FIG. 4D illustrates the format of data for audio distribution.

With reference to FIG. 4B, the 16 bits (2 bytes) at the beginning of the RTP header (including a fixed header of 12 bytes) contains an identifier for the version of the RTP, flags indicating padding settings and the presence of an extension header, the number of identifiers for contributing sources (CSRC), and marker bits. The last 7 bits of the 16 bits indicate an identifier for the RTP payload (header information). Some of the RTP payload identifiers "0" to "127" are assigned to default values for different coding schemes of audio data and video data. In the wireless communication system 1 according this embodiment, the remaining identifiers unassigned to default values are configured through an audio distribution program to indicate the presence and type of control data. For example, the RTP payload identifier "21" indicates the content of the RTP payload as being exclusively audio data with a predetermined format (compression format), as illustrated in FIG. 4C. The RTP payload identifier "22" indicates the addition of control data (additional data) having a predetermined length N to the beginning of the RTP payload and normal audio data following the control data, as illustrated in FIG. 4D.

In this case, the control data is included in the RTP payload. Alternatively, the control data may be a component of the extension header disposed behind the fixed RTP header.

As described above, the control data contains information associated with the updated access point, e.g., an SSID, key data for encryption of transmission, and the time until switching, which are disposed in sequence in accordance with a predetermined order or format. The control data is received and decrypted by the slave communication devices 20 in accordance with the order or format. The control data is embedded in the normal audio data that is periodically distributed, as necessary, and the embedded control data can be identified by an RTP payload identifier. Thus, the master communication device 10 and the slave communication devices 20 can readily switch access points at a substantially identical timing by simply installing and executing an audio distribution program and/or reception program establishing such an RTP payload identifier.

FIG. 5 is a flow chat that illustrates the control process by the CPU 11 of audio data distribution carried out at the master communication device 10.

The audio data distribution process starts in response to an input operation to the operating unit 161 of the input unit 16 of the master communication device 10 while the master communication device 10 is connected to an access point 40. After starting of the audio data distribution process, the CPU 11 digitizes the audio signal sent from the microphone 162 at a predetermined sampling rate and starts generating frame data containing the digitized audio data (Step S101). The CPU 11 determines whether the master communication device 10 is in a destination-switching preparation mode (Step S102). If the master communication device 10 is not in the destination-switching preparation mode, i.e., if the access point is not to be switched even though another access point satisfies the connection standard for the intensity of received signals (NO in Step S102), the process to be carried out by the CPU 11 proceeds to Step S104.

If the master communication device 10 is in the destination-switching preparation mode (YES in Step S102), the CPU 11 acquires the intensities of the signals sent from the access points based on the reception data of signals from the access points, and determines whether any of the signals sent from the access point preliminarily stored in an access point list (candidate list) are received at an intensity higher than or equal to a reference value (Step S103). The intensity of the received signal to be compared with the reference value may be a momentary value or a value that is stable for more than a predetermined duration. If none of the signals are received at an intensity higher than or equal to the reference value (NO in Step S103), the process to be carried out by the CPU 11 proceeds to Step S104.

In Step S104 after Step S102 or S103, the CPU 11 assigns "21" to the RTP payload identifier and sends frame data containing RTP payload consisting of merely audio data (Step S104). The process to be carried out by the CPU 11 then returns to Step S102.

If in Step S103, signals sent from a particular access point in the list is determined to be received at an intensity higher than or equal to the reference value (YES in Step S103), the CPU 11 selects this access point for connection, assigns "22" to the corresponding RTP payload identifier, and sends frame data containing RTP payload consisting of the SSID of the access point, the encryption key, the counted time, and the audio data (Step S105). The CPU 11 starts counting down the counted time as a default value to zero (Step S106).

The CPU 11 checks the counting for zero (Step S107). If the counting is not zero (NO in Step S107), the CPU 11 assigns "21" to the RTP payload identifier and sends frame data containing RTP payload consisting of audio data (Step S108). The process to be carried out by the CPU 11 then returns to Step S107.

If the counting is zero (YES in Step S107), the CPU 11 disconnects the current access point, starts the process of establishing communication with the access point selected as the next destination, carries out authentication, and establishes connection (Step S109). The CPU 11 assigns "21" to the RTP payload identifier and sends frame data containing RTP payload consisting of audio data as to the updated access point, to which communication is established (Step S110). The process to be carried out by the CPU 11 then returns to Step S102.

The audio data distribution process ends in response to an interruption process triggered by an end command input by the user.

Figure 6:
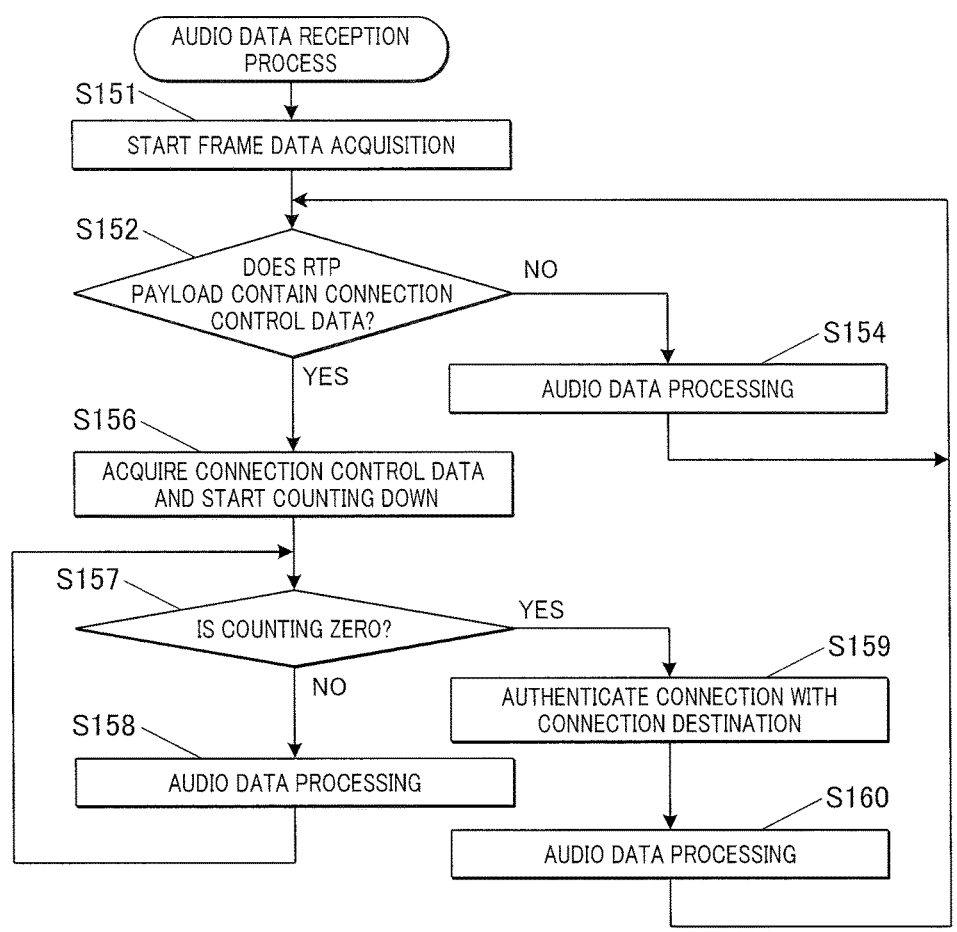
FIG. 6 is a flow chart illustrating a control process of audio data reception.

FIG. 6 is a flow chart illustrating the control process of audio data reception carried out by the CPU 21 in a slave communication device 20 according to this embodiment.

The audio data reception process starts in response to a start command issued by a predetermined operation of the operating unit 161 of the input unit 16 by the user.

Upon start of the audio data reception process, the CPU 21 starts reception of frame data containing audio data (Step S151), reads the RTP payload identifier in the acquired frame data, and determines whether the RTP payload contains connection control data (i.e., whether "22" is assigned to the RTP payload identifier) (Step S152). If the RTP payload does not contain connection control data (i.e., if "21" is assigned to the RTP payload identifier) (NO in Step S152), the CPU 21 processes (e.g., decodes) the audio data in the RTP payload determined to contain only audio data, and plays the audio signal at an appropriate timing (Step S154). The process to be carried out by the CPU 21 then returns to Step S152.

If the CPU 21 determines in Step S152 that the RTP payload contains connection control data (i.e., "22" is assigned to the RTP payload identifier) (YES in Step S152), the CPU 21 acquires the connection control data from the RTP payload and starts counting down from the counted time as a default value to zero (Step S156). The CPU 21 determines whether the counting is zero (Step S157). If the counting is not zero (NO in Step S157), the CPU 21 processes the RTP payload as audio data (Step S158).

If the counting is zero (YES in Step S157), the CPU 21 disconnects the current access point, starts the communication connection process for the access point assigned as the destination in the connection control data, carries out authentication, and establishes connection (Step S15'9). The CPU 21 processes the audio data received from the updated access point (Step S160). The process to be carried out by the CPU 21 then returns to Step S152.

The audio data reception process ends in response to an interruption process triggered by an end command input to the operating unit 161 by the user.

Modification

Figure 7:
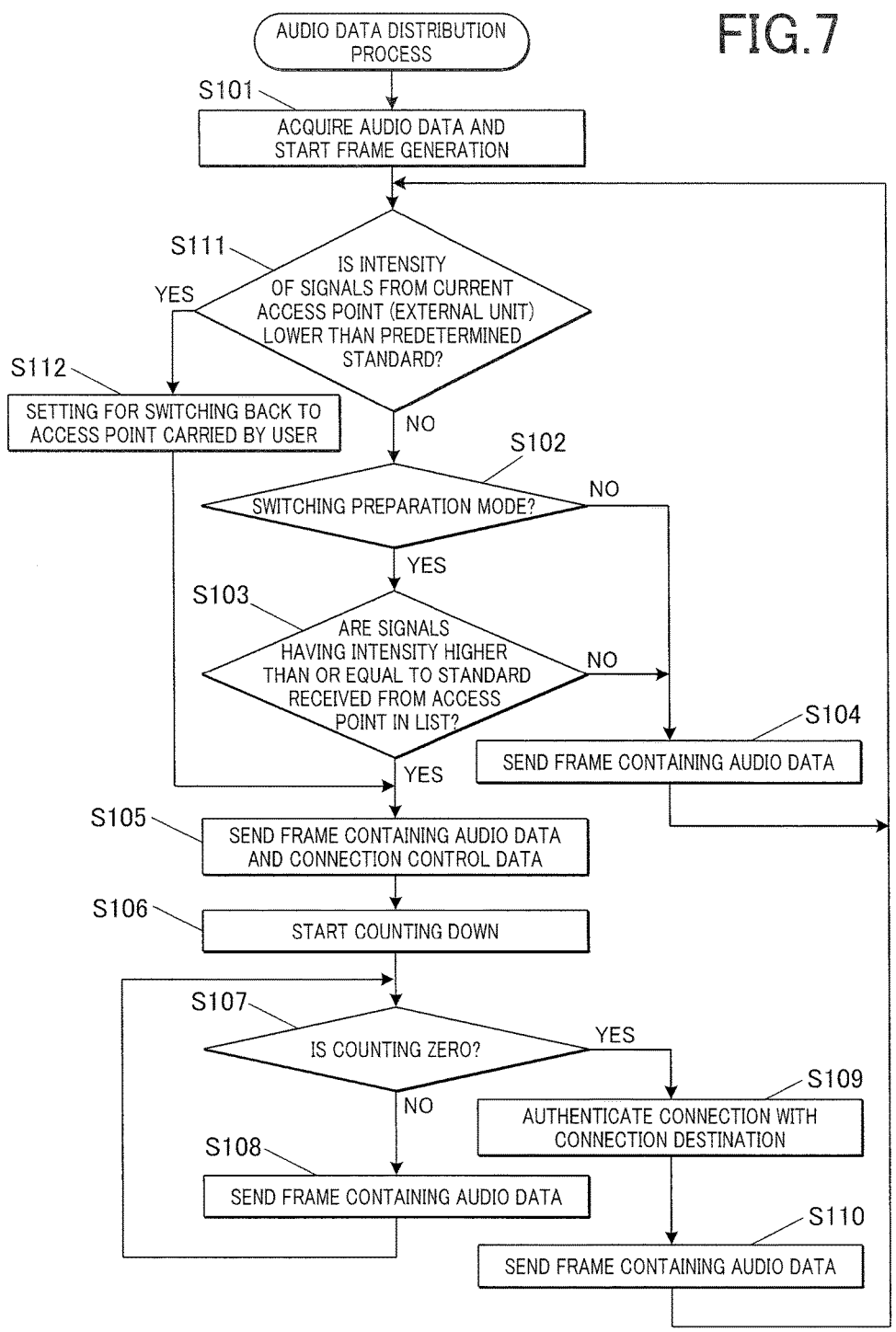
FIG. 7 is a flow chart illustrating a modified process of audio data distribution.

FIG. 7 is a flow chart illustrating an audio data distribution process carried out in the wireless communication system 1 according to a modification of this embodiment.

The audio data distribution process according this modification is carried out if an access point carried together with the master communication device 10 by a user is always in a connectable state. The access point carried by the user may be the master communication device 10. The audio data distribution process according this modification is the same as the audio data distribution process according to this embodiment described above, except for additional Steps S111 and S112. The same steps in the processes are denoted by the same reference signs, and redundant descriptions are omitted.

Upon completion of Step S101, the CPU 11 determines whether the intensity of the signals from the current access point is lower than a predetermined connection standard (i.e., whether the connection standard (connection continuing standard) is satisfied) (Step S111). If the current access point is the access point carried by the user, the intensity of the signals from the access point usually is not below the connection standard.

If the intensity of the signals is determined not to be lower than the connection standard (or if the master communication device 10 is connected to the access point carried by the user) (NO in Step S111), the process to be carried out by the CPU 11 proceeds to Step S102. If the intensity of the signals is below the connection standard (YES in Step S111), the CPU 11 provides setting for switching back the destination to the access point carried by the user and settings for the timing of switching or timing of reconnection, i.e., the time to be counted corresponding to the timing of connection (waiting time) (Step S112). The process then goes to Step S105.

In the audio data distribution process according to this modification, the regular access point is the access point carried by the user, and the destination of the access point is switched to another access point only if there is another access point transmitting signals having high intensity.

As described above, the master communication device 10 of the wireless communication system 1 according to this embodiment includes a CPU 11 and a communication unit 18 that connects to an access point for wireless communication and transmits and receives communication data via the access point by wireless communication. The CPU 11 functions as a destination setter 110 that selects an access point B, which differs from the current access point A, and determines the timing for connection to the access point B on the basis of a predetermined connection standard associated with the intensity of the received signals; a switching-request transmission controller ill that instructs the communication unit 18 to send information on the access point B and the timing of connection, to a predetermined slave communication device 20 if the setting is provided for switching to the access point B at the timing of connection; and a connection controller 112 that instructs the communication unit 18 to switch the destination to the access point B at the timing of connection determined by the destination setter 110.

Comprehensive control is achieved for assigning the same access point for the slave communication devices 20 and the master communication device 10; thus, communication can be readily maintained between the master communication device 10 and the slave communication devices 20. Multicasting of data can reduce processing load and prevent delay due to the data transmission through multiple routers.

The slave communication devices 20 each includes a controller (CPU 21) and a communication unit 28 that connects to an access point for wireless communication and transmits and receives communication data via the access point by wireless communication. The controller functions as a connection controller 210 that instructs the communication unit 28 to switch the destination to the access point B at a predetermined timing of connection if the communication unit 28 receives information on the access point B and the timing of connection to the access point B while the communication unit 28 is connected to the access point A. In this way, the access point can be switched at a timing appropriate for communication with an external master communication device 10 and other devices in response to a request from the external master communication device 10 and other devices without depending on the individual settings of the slave communication devices 20. This readily maintains communication between multiple specific wireless communication devices without high costs and troublesome operations due to addition of hardware and modification of configuration. In particular, data that is transmitted exclusively within an LAN or data that should preferably be transmitted within the LAN, such as multicast data, can be continuously and certainly received by the communication unit 28. The timing of switching to the access point B can be assigned so as to prevent variation in the actual timings of the slave communication devices 20 switching the destination to the access point B.

In the wireless communication system 1 including the master communication device 10 and the slave communication devices 20, the slave communication devices 20 switch an access point in response to a destination switching request from the master communication device 10, at the same timing as the master communication device 10 switches the access point; thus, the switching of access points can be controlled through a simple process without additional hardware. Thus, the communication between the master communication device 10 and the slave communication devices 20 can be readily and appropriately maintained without further investment in facilities and inaccessibility of access points due to lack of hardware support. Such comprehensive switching of access points can prevent the communication devices in the wireless communication system 1 from accessing access points for a duration longer than necessary. Disharmonious switching of access points by the transmitter and receivers of the data can cause frequent modifications in the data delivery route, which causes delay in data delivery and communication failure. Such drawbacks can be prevented.

The audio distribution program 150 installed in the master communication device 10 instructs a computer (master communication device 10) including a communication unit 18 that connects to an access point for wireless communication and transmits and receives communication data via the access point by wireless communication, to function as a destination setter 110 that selects an access point B, which differs from the current access point A, and determines the timing for connection to the access point B on the basis of a predetermined connection standard associated with the intensity of the received signals; a switching-request transmission controller 111 that instructs the communication unit 18 to send information on the access point B and information at the timing of connection, to a predetermined slave communication device 20 if setting are provided for switching the destination to the access point B; and a connection controller 112 that instructs the communication unit 18 to switch the destination to the access point B at the timing of connection determined by the destination setter 110.

In this way, the access points connected to the slave communication devices 20 for communication can be comprehensively controlled through mere software execution, without modification and/or addition of hardware. This can readily maintain the communication between the master communication device 10 and the slave communication devices 20, and thus data can be transmitted and received without a large delay. In particular, data that should be transmitted in real time and data to be multicast to multiple slave communication devices 20 can be certainly transmitted and received without applying load to the network.

The audio reception program 251 installed in each of the slave communication devices 20 according to this embodiment instructs the computer (controller) of the slave communication device 20 including a communication unit 28 that connects to an access point for wireless communication and transmits and receives communication data via the access point by wireless communication, to function as a connection controller 210 that instructs the communication unit 28 to switch the destination to an access point B at a predetermined connection timing if the communication unit 28, which is connected to the access point A, receives information on the access point B and information at the timing of connection to the access point B.

In this way, the slave communication devices 20 can readily switch the access point at a same timing as the master communication device 10 through mere software execution, without hardware support. Thus, the slave communication devices 20 can continuously receive communication data from the master communication device 10 without a large delay and a high load on the network.

The audio distribution program 150 instructs the master communication device 10 (computer) to function as the destination setter 110 that determines the access point B on the basis of the intensity of the signals from access points received by the communication unit 18; thus, the access point B can be selected on the basis of the actual availability of the access point B by the master communication device 10 and the slave communication devices 20 in the periphery.

The audio distribution program 150 instructs the computer to function as the destination setter 110 that selects a destination access point that sends signals constantly having an intensity higher than or equal to a predetermined reference value for a predetermined duration and assigns this access point as the access point B; thus, an access point in a reception state that is appropriate for stable connection can be certainly selected as an access point.

The audio distribution program 150 instructs the computer to function as the destination setter 110. If the access point B does not satisfy the standard for continuing connection based on a predetermined signal intensity during connection of the computer to the access point B, the destination setter 110 reassigns the access point B as a destination and determines the timing of reconnection to the access point A. If the settings are provided for switching the destination to the access point A, the switching-request transmission controller 111 instructs the communication unit 18 to send information on the access point A and information at the timing of reconnection to the slave communication devices 20 and the connection controller 112 instructs the communication unit 18 to switch the destination to the access point A at the timing of reconnection.

When the access point A carried by the user is always connectable to the master communication device 10 and the slave communication devices 20, the destination access point of these communication device can be comprehensively switched to another available fixed access point; thus, the load applied to the access point A carried by the user can be reduced. A fixed access point B often has higher performance than a portable access point A carried by a user and thus can establish efficient communication. Such a fixed access point B is advantageous in broadcasting information relevant to the location of the fixed access point B, e.g., description of the location of the access point B being a tourist site or guidance for the location of the access point B being a store. This guides the destination of the slave communication devices 20 to the access point B at an appropriate timing.

The audio distribution program 150 instructs the master communication device 10 (computer) to function as a data transmission controller 114 that sends RTP payload containing audio data compressed in a predetermined format to the slave communication devices 20; and as a switching-request transmission controller 111 that adds information on the access point B and information at the timing of connection, to the RTP payload containing the audio data and instructs the communication unit 18 to send the RTP payload with the additional information.

That is, a format for optionally adding information to normally formatted data associated with audio distribution, which is sent from the master communication device 10 to the slave communication devices 20, can be defined to transmit information on the switching of destination together with audio data, which is usually continuously distributed in short cycles; thus, the destination of the access points of the slave communication devices 20 can be readily and comprehensively controlled without a complicated communication process and an increase in traffic.

Such distributed data, which is audio data, video data, or a combination of these, can be readily managed through the transmission of connection control data together with other data constantly and periodically transmitted in short cycles. Furthermore, jumping or interruption of the audio data and video or image data played due to disconnection by a slave communication device 20 can be efficiently prevented.

An RTP header is added to the distributed data containing payload consisting of audio data. The RTP header contains an RTP payload identifier containing information indicating the presence of connection control data added to the distributed data. Thus, the slave communication device 20 confirms the RTP payload identifier to determine the format of the RTP payload, readily acquires the settings for switching an access point 40 in accordance with the format, and switches the destination of the access point at an appropriate timing.

The audio distribution program 150 instructs the computer to function as the data transmission controller 114 that instructs the communication unit 18 to multicast or broadcast the audio data to the slave communication devices 20. Establishing the same destination access point for the master communication device 10 and the slave communication devices 20, as described above, readily keeps these communication devices within a subnet defined by the transmission range of multicasting or broadcasting. That is, data can be continuously distributed to the slave communication devices 20 without interruption or jumping during switching of the destination and without applying load to the network due to unicasting, for example.

The master communication device 10 is provided with a storage unit 15 that stores a list of access points available as a destination. This makes the master communication device 10 (computer) function as a storage unit for storing a list of candidate access points available as an access point 40. The destination setter 110 selects an access point B from the access points in the list.

Thus, if multiple access points transmitting signals exist in the vicinity, an available access point can be readily and quickly selected, determined whether it can be assigned as a destination access point B, and established as the destination. Public access points that are not preferable for connection due to security problems and/or non-support of multicasting or broadcasting can be eliminated from the destinations.

Information at the timing of connection contains the waiting time until the start of the operation of switching the destination to the access point B. This allows transmission of data without consideration of the difference in the clocks of the master communication device 10 and the slave communication devices 20 and transmission of data having a smaller size clock data, compared with transmission of data on date and time.

Similarly, the information at the timing of reconnection contains the waiting time until the start of the operation of switching back the destination to the access point A carried by a user. This achieves the same advantages as the waiting time or information at the timing of connection, which is described above.

The slave communication devices 20 receive the information on the access point B and the information at the timing of connection to the access point B from a predetermined wireless communication device. This prevents the slave communication devices 20 from being guided and connected to an inappropriate destination access point through a communication device operated by a malicious user, and readily guides the slave communication devices 20 to an appropriate destination.

Second Embodiment

A wireless communication system according to the second embodiment of the present invention will now be described.

The overall configuration of a wireless communication system 1 and the functional configurations of a master communication device 10 and slave communication devices 20 according to the second embodiment are the same as those of the wireless communication system 1 according to the first embodiment. Thus, the same components are denoted by the same reference signs, and redundant descriptions will be omitted.

Audio data distribution in the wireless communication system according to the second embodiment will now be described.

Figure 8:
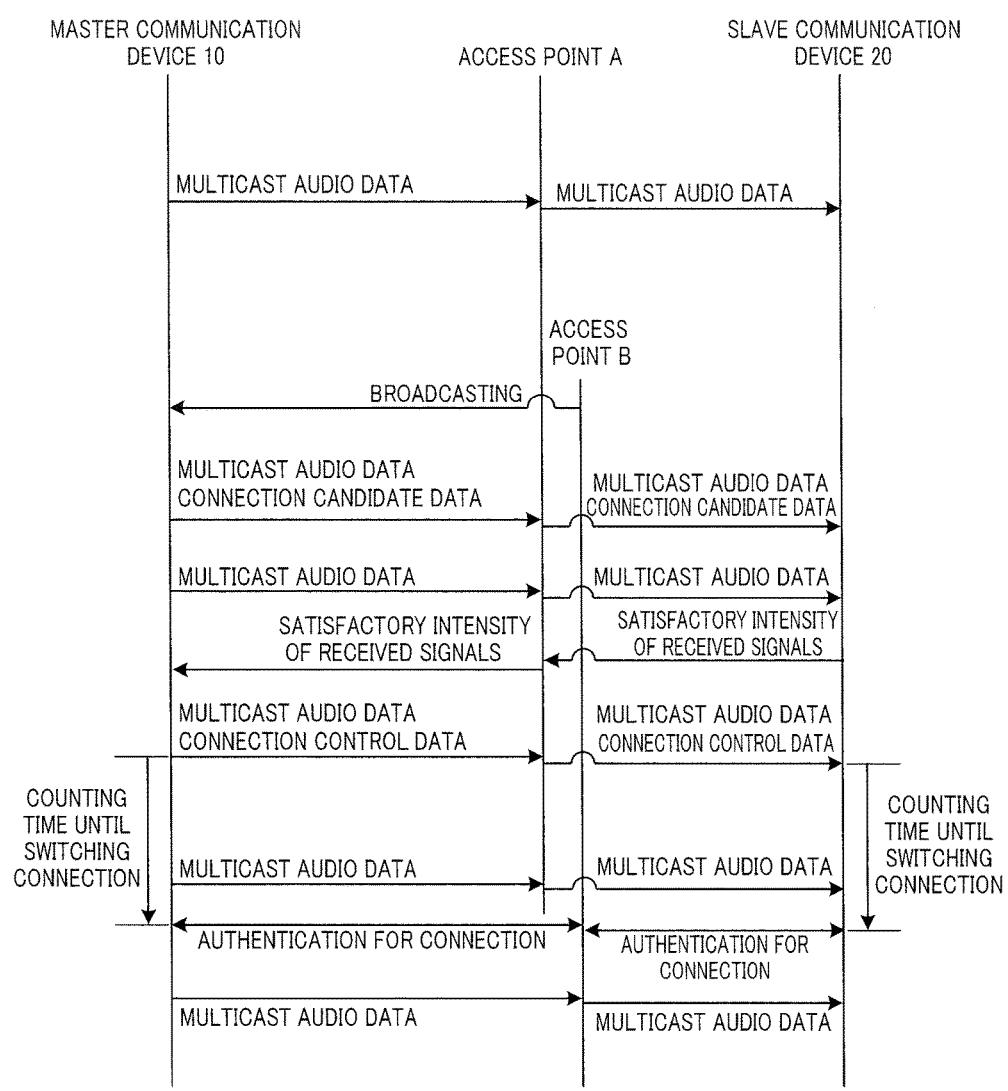
FIG. 8 illustrates a communication sequence involving audio distribution among a master communication device, an access point, and a slave communication device in a wireless communication system according to a second embodiment.

FIG. 8 illustrates a sequence involving data transmission among a master communication device 10, slave communication devices 20, and an access point 40 in a wireless communication system 1 according to the second embodiment.

In the wireless communication system 1 according this embodiment, if signals (a reply to broadcasting of beacon or a probe request) from a router of an access point received by the master communication device 10 satisfies a connection standard for the intensity of received signals, the CPU 11 (including a candidate-confirmation transmission controller and an announcement-request transmission controller) instructs a communication unit 18 to multicast information on candidate access point (candidate confirmation information) containing information on an access point satisfying the connection standard, to the slave communication devices 20 together with audio data. The slave communication devices 20 that receive the information on the candidate access point acquire the intensity of signals from the router of the candidate access point, confirm that the signals satisfy the intensity standard at the slave communication devices 20, and reply signals (candidate confirmation information) that indicate that the intensity of the received signals is satisfactory. Such a reply should be unicasted to the master communication device 10 as payload (IP packets) according to normal UDP/IP (or TCP/IP). Upon reception of a reply indicating satisfactory intensity of received signals from every slave communication device 20, the master communication device 10 multicasts the audio data and the connection control data to the slave communication devices 20 and updates the access point after counting time.

The RTP payload identifier sent with the information on the candidate access point is assigned a value other than "21" and "22," which are described above. In this case, "23" is assigned to the RTP payload identifier to indicate that, for example, an SSID corresponding to a candidate access point is included in the 32 bytes at the beginning of the RTP payload.

Figure 9:
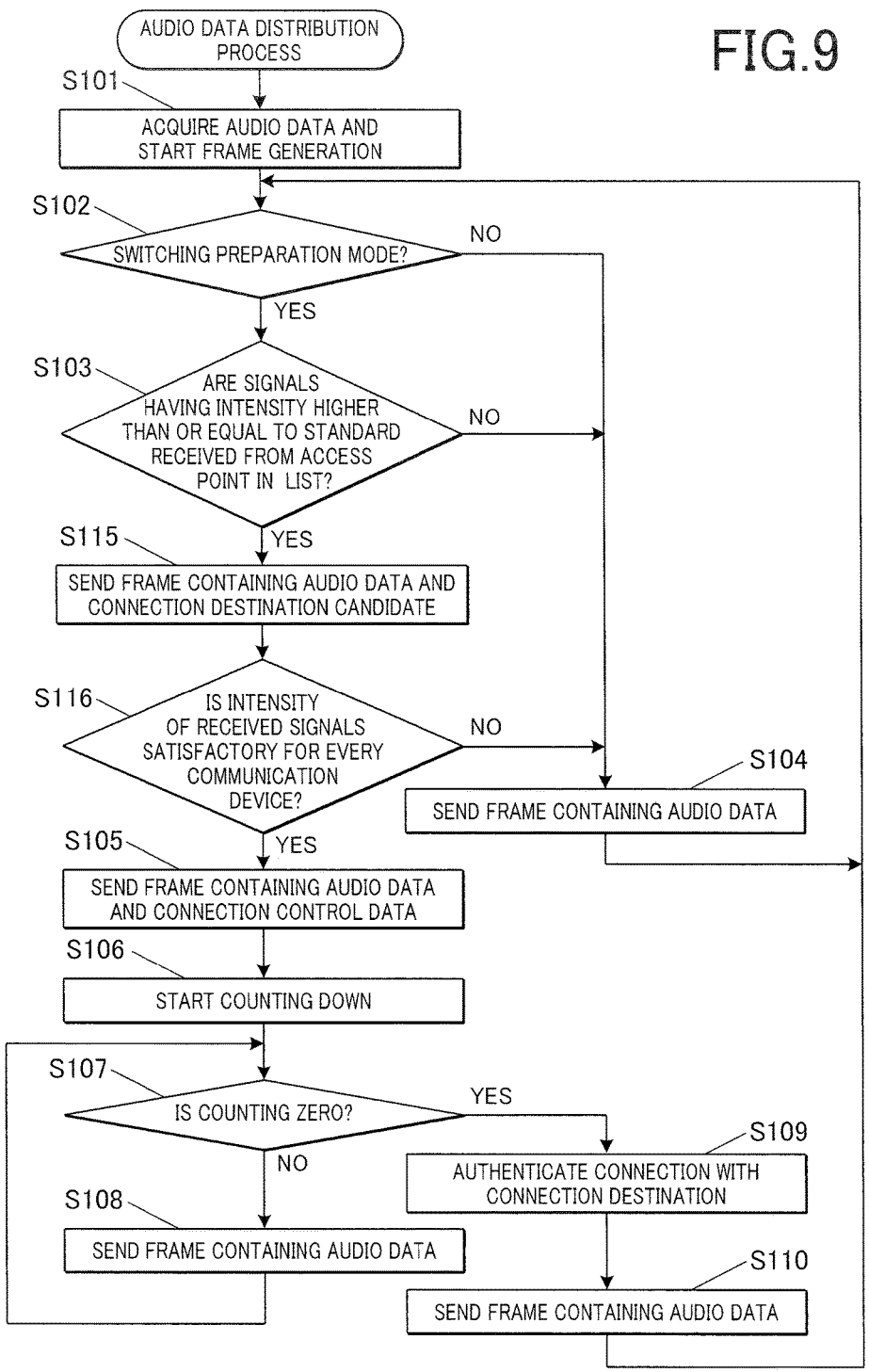
FIG. 9 is a flow chart illustrating a control process of audio data distribution according the second embodiment.

FIG. 9 is a flow chart illustrating a control process of audio data distribution carried out by the CPU 11 of the master communication device 10 according to this embodiment.

This audio data distribution process is the same as that according to the first embodiment, except that Steps S115 and S116 are carried out between Steps S103 and S105. Thus, the same steps in the process are denoted by the same reference signs, and redundant descriptions are omitted.

If in Step S103, signals are determined to be received from an access point in the candidate list at an intensity higher than or equal to the reference value (YES in Step S103), the CPU 11 selects this access point as a candidate access point, assigns "23" to an RTP payload identifier, and multicasts RTP payload containing audio data and an SSID of the candidate access point to the slave communication devices 20 (Step S115).

The CPU 11 reassigns "21" to the RTP payload identifier, sends frame data containing RTP payload consisting of only audio data, and simultaneously waits for a reply on the reception condition from every slave communication device 20. Upon reception of the replies from the slave communication devices 20, the CPU 11 determines whether the intensity of the signals received by the slave communication devices 20 are satisfactory based on these replies (Step S116). If any of the slave communication devices 20 is determined to receive signals with unsatisfactory intensity (NO in Step S116), the CPU 11 reserves the candidate access point. The process then goes to Step S104. If the intensity of signals received by every slave communication device 20 is determined to be satisfactory (YES in Step S116), the CPU 11 carries out Step S105 of the process.

If in Step S116, any of the slave communication devices 20 is determined to be receiving signals at unsatisfactory intensity, the CPU 11 can instruct the communication unit 18 to send a request (announcement request information) for an announcement requesting this slave communication device 20 to approach the master communication device 10. The announcement operation is appropriately selected from operations executable by the output unit 27 of the slave communication device 20. For example, a message may be displayed on a screen or a predetermined beep may be sound. The operations executable by the output unit 27 may be selected or the slave communication device 20 may be assigned by the master communication device 10. The master communication device 10 may send the announcement request information to every slave communication device 20.

The master communication device 10 automatically and repeatedly sends queries after a predetermined time and/or sends queries in response to a manual operation by the user, to the reserved candidate access point so as to confirm whether signals are received with satisfactory intensity, until every slave communication devices 20 replies with information indicating that the intensity of the received signals is satisfactory. Alternatively, the CPU 11 may rule out the candidate access point. In such a case, the corresponding access point may be prohibited from selection as a candidate for a predetermined time.

Figure 10:
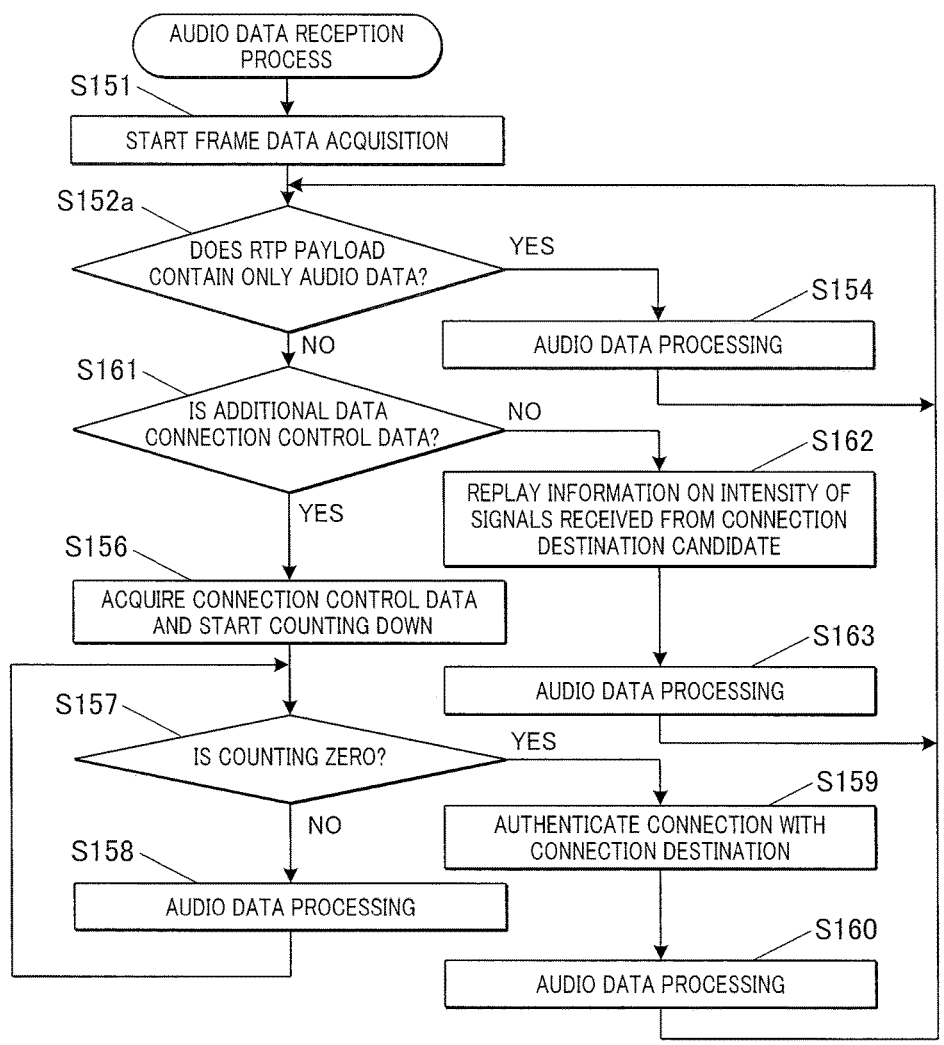
FIG. 10 is a flow chart illustrating a control process of audio data reception according to the second embodiment.

FIG. 10 is a flow chart illustrating a control process of audio data reception carried out by the CPU 21 of a slave communication device 20 according to this embodiment.

This audio data reception process is the same as that according to the first embodiment, except that Step S152 is replaced by Step S152a and Steps S161 to S163 are added. Thus, the same steps in the process are denoted by the same reference signs, and redundant descriptions are omitted.

Upon start of acquisition of frame data containing audio data in Step S151, the CPU 21 determines whether the RTP payload of the acquired frame data consists of only audio data, i.e., whether "21" is assigned to the RTP payload identifier (Step S152a). If the RTP payload is determined to consist of only audio data (YES in Step S152a), the process to be carried out by the CPU 21 goes to Step S154. Upon completion of Step S154, the process to be carried out by the CPU 21 returns to Step S152a.

If the RTP payload is determined not to consist of only audio data (NO in Step S152a), the CPU 21 determines whether the connection control data contains additional data other than audio data, i.e., whether "22" is assigned to the RTP payload identifier (Step S161). If the additional data is determined to consist of connection control data (YES in Step S161), the process to be carried out by the CPU 21 goes to Step S156. Upon completion of Step S160, the process to be carried out by the CPU 21 goes to Step S152a.

If the additional data is determined not to consist of connection control data, i.e., "23" is assigned to the RTP payload identifier (NO in Step S161), the CPU 21 acquires information on a candidate access point, receive signals from the candidate access point, and determines whether the intensity of the signals satisfy the standard. The CPU 21 unicasts the results to the master communication device 10 (Step S162). The CPU 21 processes the audio data in the received RTP payload and plays the audio signal at an appropriate timing (Step S163). The process to be carried out by the CPU 21 then returns to Step S152a.

As described above, the audio distribution program 150 executed by the master communication device 10 of the wireless communication system 1 according to the second embodiment instructs the controller (CPU 11) of the master communication device 10 to implement the following functions: the controller functions as a candidate-confirmation transmission controller that instructs the communication unit 18 to send candidate confirmation information to the slave communication devices 20 to determine whether an access point B, which is detected to be transmitting signals that satisfy a connection standard for selecting an access point, satisfies the connection standard at each of the slave communication devices 20; the CPU 11 functions as a destination setter 110 that assigns the access point B as a new access point, if candidate confirmation information, which indicates that the signals from the access point B detected at the slave communication devices 20 satisfy a connection standard, is received by the communication unit 18 from every slave communication device 20 in response to the candidate confirmation information; and the CPU 11 functions as a switching-request transmission controller 111 that instructs the communication unit 18 to send information on the access point B and information at the timing of connection to the access point B.

In this way, the destination access point is updated after confirming that the master communication device 10 and all of the slave communication devices 20 are connectable to the access point B. This certainly prevents the slave communication devices 20 from failing to update the access point, thereby failing to establish communication with the master communication device 10. Thus, the data can be certainly transmitted from the master communication device 10 to the slave communication devices 20.

This also certainly reduces the processing load on the access point A carried out by the user, which is the access point before update.

The audio distribution program 150 according to this embodiment instructs the master communication device 10 to function as an announcement-request transmission controller that instructs the communication unit 18 to send announcement request information for requesting an announcement that requests at least some of the slave communication devices 20 that have not sent back candidate confirmation information, to approach the master communication device 10.

In this way, the destination can be quickly updated to the access point B without delay even if any of the users of the slave communication devices 20 are located too far away from the master communication device 10. This also guides the users of the slave communication devices 20 in a predetermined direction.

The embodiments described above should not be construed to limit the present invention and can include various modifications.

For example, in the embodiment described above, an access point is updated in accordance with RTP data containing control data associated with the destination during real-time audio transmission with RTP. Alternatively, the control data and the RTP data may be sent separately. In addition to real-time audio data, video data (which may or may not contain audio data) may be transmitted. In such a case, the data should be transmitted according to appropriate protocols and formats. In such a case, the output units 17 of the slave communication devices 20 are provided with display screens that can output images.

The data to be distributed may be prerecorded audio data. In such a case, the user of the master communication device 10 may appropriately play or pause the audio data. The user of the master communication device 10 can play the audio data without noticing the switching of access points.

In the embodiments described above, a destination is updated based on the intensity of signals received from an access point 40. Alternatively, the updating may be controlled on the basis of positional information of the master communication device 10, the slave communication devices 20, and the access point 40, which indicates the master communication device 10 and all of the slave communication devices 20 are connectable to the access point 40.

In the embodiments described above, data at the timing of connection contains the time until the start of the operation for connection to the access point 40. Alternatively, the current time may be used. In such a case, the time and date of the master communication device 10 and the slave communication devices 20 should preferably be the same. For example, the communication devices can frequently acquire the time and date from base stations of mobile phones to update the current time, or the current time of the master communication device 10 can be sent to the slave communication devices 20 upon start of communication between the master communication device 10 and the slave communication devices 20.

In the embodiment described above, audio data is multicast or broadcasted to the slave communication devices 20. Alternatively, the audio data may be unicasted if only a small number of slave communication devices 20 are used or if the data to be transmitted contains still images and/or text, which is preferably transmitted with TCP/IP.

In the modification of an embodiment, the reference value for the intensity of received signals, which is referred to as a connection standard for switching to another access point, and the reference value for the intensity of received signals, which is referred to as a standard of maintaining the current connection or reconnecting to an access point carried by a user, may be provided independently. For example, the reference value for reconnection may be smaller than the reference value for connection.

In the embodiments described above, the master communication device 10 and the slave communication devices 20 are configured separately. Alternatively, every communication device may be mutually connected, and one of the communication devices may control the selection of the access points. The selection of the access point may be controlled by a predetermined slave communication device 20, instead of the master communication device 10. In the embodiment described above, the audio distribution program 150 is stored in the master communication device 10, and the audio reception program 251 is stored in the slave communication devices 20. Alternatively, a single program package (application software) containing both the audio distribution program 150 and the audio reception program 251 may be stored or installed in both the master communication device 10 and the slave communication devices 20. The communication control sub-program 151 may be included in both the audio distribution program 150 and the audio reception program 251.

In the embodiments described above, the CPUs 11 and 21 serve as processors that perform software control to execute programs and carry out various control processes. Alternatively, a dedicated logic circuit (hardware) may be used alone or together with the CPUs 11 and 21.

In the description above, the storage units 15 and 16, which are portable external storage media, such as MiniSD cards, are described as computer-readable media that store the audio distribution program and the audio reception program according to the present invention. Alternatively, the storage units 15 and 16 may be any other suitable computer-readable media. Other computer-readable media include portable recording media, such as hard disk drives (HDDs), flash memories conforming to various standards, CD-ROMs, and DVDs. Carrier waves may also be applied to the present invention as a medium that provides program data according to the present invention via a communication line.

The detailed configurations, processing details, and processes according to the embodiments of the present invention described above may be modified in various ways without departing from the scope of the invention.

The present invention should not be limited to the embodiments described above, and the claims and other equivalents thereof are included in the scope of the invention.

What is claimed is:

1. A wireless communication device, comprising:
   a wireless communication unit that connects to relays for wireless communication and transmits and receives communication data via the relays by wireless communication; and
   a processor that:
   determines a second relay different from a first relay currently connected to the wireless communication unit and a timing of connection to the second relay based on a predetermined connection standard,
   instructs the wireless communication unit to send information on the second relay and information on the timing of connection to other predetermined wireless communication device when settings are provided for switching destination to the second relay at the timing of connection, and
   instructs the wireless communication unit to switch the destination to the second relay at the timing of connection,
   wherein the information on the timing of connection indicates a timing of instructing the other predetermined wireless communication device to switch the destination to the second relay.

2. The wireless communication device according to claim 1,
   wherein the processor instructs the wireless communication unit to switch the destination to the second relay at the timing of connection when the wireless communication unit of the other predetermined wireless communication device which is connected to the first relay receives the information on the second relay and the information on the timing of connection to the second relay.

3. A wireless communication device comprising:
a wireless communication unit that connects to relays for wireless communication and transmits and receives communication data via the relays by wireless communication; and
a processor that instructs the wireless communication unit to switch destination to a second relay at a timing of connection to the second relay when the wireless communication unit connected to the first relay receives information on the second relay and information on the timing of connection which are sent from a predetermined wireless communication device that receives the communication data via the relays.

4. A wireless communication system comprising a master wireless communication device and a slave wireless communication device that establish mutual communication,
wherein the master wireless communication device comprises:
a first wireless communication unit that connects to relays for wireless communication and transmits and receives communication data via the relays by wireless communication; and
a first processor that determines a second relay different from a first relay currently connected to the first wireless communication unit and a timing of connection to the second relay based on a predetermined connection standard, instructs the first wireless communication unit to send information on the second relay and information on the timing of connection to the slave wireless communication device when settings are provided for switching destination to the second relay at the timing of connection, and instructs the first wireless communication unit to switch connection to the second relay at the timing of connection,
wherein the information on the timing of connection indicates a timing of instructing the slave wireless communication device to switch the destination to the second relay, and
wherein the slave wireless communication device comprises:
a second wireless communication unit that connects to the relays and transmits and receives communication data via the relays by wireless communication; and
a second processor that instructs the second wireless communication unit to switch destination to the second relay at the timing of connection when the information on the second relay and the information on the timing of connection to the second relay which are sent from the master wireless communication device are received by the second wireless communication unit connected to the first relay.

5. A non-transitory computer-readable recording medium that stores a program to be executed by a computer comprising a wireless communication unit that connects to relays for wireless communication and transmits and receives communication data via the relays by wireless communication, the program causing the computer to:
determine a second relay different from a first relay currently connected to the wireless communication unit and a timing of connection to the second relay based on a predetermined connection standard;
instruct the wireless communication unit to send information on the second relay and information on the timing of connection to predetermined wireless communication devices when settings are provided for switching destination to the second relay; and
instruct the wireless communication unit to switch destination to the second relay at the timing of connection,
wherein the information on the timing of connection indicates a timing of instructing the predetermined wireless communication devices to switch the destination to the second relay.

6. The non-transitory computer-readable recording medium according to claim 5,
wherein the program causes the computer to instruct the wireless communication unit of the predetermined wireless communication devices which are connected to the first relay to switch destination to the second relay at the timing of connection to the second relay when the wireless communication unit receives the information on the second relay and the information on the timing of connection.

7. The non-transitory computer-readable recording medium according to claim 6,
wherein the information on the second relay and the information on the timing of connection to the second relay are received from one of the predetermined wireless communication devices.

8. The non-transitory computer-readable recording medium according to claim 5,
wherein the program causes the computer to select the second relay based on intensity of signals from the relays received by the wireless communication unit.

9. The non-transitory computer-readable recording medium according to claim 8,
wherein the program causes the computer to select one of the relays that sends signals having an intensity higher than a reference value for a predetermined duration or more and assigns the one of the relays as the second relay.

10. The non-transitory computer-readable recording medium according to claim 5,
wherein the program causes the computer to:
reassign the first relay to the destination and determines a timing of reconnection to the first relay when the second relay does not satisfy a standard for continuing connection while the second relay is connected to the wireless communication unit;
instruct the wireless communication unit to send information on the first relay and information on the timing of reconnection to the predetermined wireless communication devices when the settings are provided for switching the destination to the first relay; and
instruct the wireless communication unit to switch the destination to the first relay at the timing of reconnection.

11. The non-transitory computer-readable recording medium according to claim 10,
wherein the information on the timing of reconnection comprises a waiting time until start of switching the destination to the first relay.

12. The non-transitory computer-readable recording medium according to claim 5, wherein the program causes the computer to:
send data having a predetermined format to the predetermined wireless communication devices; and
add the information on the second relay and the information on the timing of connection to the data having the predetermined format and send the data having the predetermined format with the additional information from the wireless communication unit.

13. The non-transitory computer-readable recording medium according to claim 12,
wherein the data having the predetermined format comprises audio data, video data, or a combination of audio data and video data.

14. The non-transitory computer-readable recording medium according to claim 12,
wherein the predetermined format comprises header information on the presence of the additional information.

15. The non-transitory computer-readable recording medium according to claim 12,
wherein the program causes the computer to instruct the wireless communication unit to multicast or broadcast the data having the predetermined format to the predetermined wireless communication devices.

16. The non-transitory computer-readable recording medium according to claim 5,
wherein the program causes the computer to:
instruct the wireless communication unit to send candidate confirmation information to the predetermined wireless communication devices to determine whether a relay satisfies the predetermined connection standard for selecting the second relay at the predetermined wireless communication devices when the relay satisfying the predetermined connection standard is detected;
assign the detected relay as the second relay when candidate approval information indicating that the detected relay satisfies the predetermined connection standard at the predetermined wireless communication devices is received by the wireless communication unit from the predetermined wireless communication devices in response to the transmission of the candidate confirmation information; and
instruct the wireless communication unit to send the information on the second relay and the information on the timing of connection.

17. The non-transitory computer-readable recording medium according to claim 16,
wherein the program causes the computer to instruct the wireless communication unit to send announcement request information for requesting an announcement that requests at least some of the predetermined wireless communication devices that have not sent back the candidate approval information, to approach the computer when the candidate approval information is not received from the at least some of the predetermined wireless communication devices.

18. The non-transitory computer-readable recording medium according to claim 5,
wherein the program causes the computer to:
store a list of candidate relays available as the second relay; and
select the second relay from the relays in the list of candidate relays.

19. The non-transitory computer-readable recording medium according to claim 5,
wherein the information on the timing of connection comprises a waiting time until start of switching the destination to the second relay.

20. A non-transitory computer-readable recording medium that stores a program to be executed by a computer comprising a wireless communication unit that connects to relays for wireless communication and transmits and receives communication data via the relays by wireless communication, the program causing the computer to:
instruct the wireless communication unit to switch destination to a second relay at a timing of connection to the second relay when the wireless communication unit connected to the first relay receives information on the second relay and information on the timing of connection which are sent from a predetermined wireless communication device.

* * * * *